United States Patent [19]

Stahel

[11] 4,450,176

[45] May 22, 1984

[54] METHOD OF TREATING SOYBEAN MATERIAL

[75] Inventor: Nancy G. Stahel, Minneapolis, Minn.

[73] Assignee: Land O'Lakes, Inc., Arden Hills, Minn.

[21] Appl. No.: 410,351

[22] Filed: Aug. 23, 1982

[51] Int. Cl.$^3$ .................. A23L 1/20; A23K 1/18
[52] U.S. Cl. .................. 426/2; 426/634; 426/807; 426/486; 426/635; 426/520; 426/468
[58] Field of Search .............. 426/634, 430, 468, 807, 426/2, 486, 635, 520

[56] References Cited

U.S. PATENT DOCUMENTS

| | | |
|---|---|---|
| 1,541,006 | 6/1925 | Thevenot . |
| 1,606,052 | 11/1926 | Bollmann . |
| 2,444,241 | 6/1948 | Beckel et al. ............... 99/14 |
| 2,445,931 | 7/1948 | Beckel et al. ............... 260/412.4 |
| 2,615,905 | 10/1952 | Forstmann ............... 260/412.4 |
| 2,635,094 | 4/1953 | Belter et al. ............... 260/123.5 |
| 3,023,107 | 2/1962 | Mustakas et al. ............... 99/98 |
| 3,043,826 | 7/1962 | Beaber et al. ............... 260/123.5 |
| 3,168,406 | 2/1965 | Moshy ............... 99/99 |
| 3,170,802 | 2/1965 | Fukushima ............... 99/145 |
| 3,202,084 | 8/1965 | Hale et al. ............... 99/235 |
| 3,218,307 | 11/1965 | Eldridge et al. ............... 426/634 X |
| 3,252,807 | 5/1966 | Kuramoto ............... 99/90 |
| 3,268,503 | 8/1966 | Mustakas et al. ............... 260/123.5 |
| 3,721,569 | 3/1973 | Steinkraus ............... 99/98 |
| 3,891,774 | 6/1975 | Baker et al. ............... 426/104 |
| 3,897,574 | 7/1975 | Pass ............... 426/430 |
| 3,925,569 | 12/1975 | Daftary ............... 426/634 |
| 3,970,764 | 7/1976 | Karnofsky ............... 426/430 |
| 4,079,155 | 3/1978 | Kakade ............... 426/634 |
| 4,113,716 | 9/1978 | Gomi et al. ............... 426/634 X |
| 4,132,808 | 1/1979 | Kakade ............... 426/2 |
| 4,265,925 | 5/1981 | Campbell et al. ............... 426/430 X |
| 4,318,933 | 3/1982 | Miller ............... 426/431 |

OTHER PUBLICATIONS

Mustakas, G. C. et al., "Flash Desolventizing Defatted Soybean Meals Washed with Aqueous Alcohols to Yield a High-Protein Product," JAOCS, vol. 39, No. 4, Apr. 1962, pp. 222-226.

*Primary Examiner*—Robert A. Yoncoskie
*Attorney, Agent, or Firm*—Kinney & Lange

[57] ABSTRACT

A bland and nutritive soybean food product is produced by a process involving the steps of heating a proteinaceous soybean material with steam to preferably 220° F. and subjecting the proteinaceous soybean material to lower alcohol vapors. Initially, the soybean material is placed in a closed vessel and the alcohol is added to the soybean material in a preferred weight ratio of approximately 9 pounds alcohol to 60 pounds soybean material along with a small quantity of water. The vessel has agitators that agitate the soybean material sufficiently to "fluidize" the material within the vessel. Steam is injected into the vessel and when the temperature of the soybean material preferably reaches 220° F., the steam is stopped and the proteinaceous soybean material is kept at that temperature in the closed vessel for at least thirty minutes. The vessel is then vented at subatmospheric pressure, removing substantially all of the alcohol from the proteinaceous soybean material along with the undesirable flavor constituents.

15 Claims, No Drawings

METHOD OF TREATING SOYBEAN MATERIAL

BACKGROUND OF THE INVENTION

1. Field of the Invention

The present invention relates to the preparation of improved high-protein food products from soybeans, in particular, it relates to a process for making the soybean food product more digestible and for removing a substantial amount of the undesirable flavor constituents using lower alcohols.

2. Description of the Prior Art

The use of alcohols as a solvent in the extraction of oil from soybeans is noted in the two volume treatise on "Soybeans and Soybean Products," edited by Markley, Interscience, 1950. In one instance, mentioned by the editor, as being described by Beckel and Smith in Vol. 16 of "Food Industries," 1944, pages 616–644, alcohol with a small proportion of water was used under pressure to extract the oil while avoiding denaturization of the protein.

More recently, in the Moshy U.S. Pat. No. 3,168,406, a process is disclosed wherein alcohol and water are used to treat soybean meal to make the soybean meal bland and odorless. The process includes mixing soybean flour with alcohol to form a slurry such that the pH is adjusted to the isoelectric range of soy proteins, that is about pH 4–6. The slurry is then heated to a temperature range of 175°–212° F. and cooked for preferably sixty minutes. The supernatent liquid is then removed from the soybean flour by any well known process and the resulting filter cake is washed a number of times with water to remove the alcohol. In one example, the filter cake was dried in a vacuum pan dryer at 28 inches of vacuum at 110° F.

In the Kakade U.S. Pat. Nos. 4,079,155 and 4,132,808, which are assigned to the same assignee as the present application, a proteinaceous soybean material is subjected to a lower alcohol vapor in a pressure chamber under superatmospheric pressure. Simultaneously, the alcohol vapors are slowly and continuously removed from the chamber to volatilize certain undesirable flavor constituents, carrying off the flavor constituents with the escaping vapors. Although the process, as disclosed in the Kakade Patents, produces a satisfactory product in terms of a bland and odorless soybean product, a considerable amount of alcohol is used. Specifically, the ratio of alcohol to soybean flour used was 33 pounds of alcohol to 60 pounds of soybean flour or approximately one part of alcohol to every two parts of soybean flour that is treated.

SUMMARY OF THE INVENTION

The present invention is an improved process for treating soybean material to make the soybean material digestable and to extract undesirable tastes and odors making the soybean product bland and odorless. The process uses a substantially smaller amount of alcohol than other known processes to remove the undesirable flavor constituents naturally found within the soybean meal and directly subjects the soybean material to a minimal amount of steam.

Briefly, the process includes placing the soybean material in a closed vessel and adding the alcohol to the soybean material in a preferred ratio of approximately at least 9 pounds material to 60 pounds soybean material. The vessel has suitable agitators that agitate the soybean material sufficiently to "fluidize" the material within the vessel. Steam is injected into the vessel and through the soybean material, heating the material to a preferred treatment temperature of approximately 220° F. The combination of the alcohol vapor and the fluidization of the soybean material maximizes the efficient use of the alcohol in altering the structure of the protein for better digestability of the soybean meal and extracting undesirable flavor constituents from the soybean meal.

When the proteinaceous soybean material has reached a temperature of approximately 220° F., the flow of steam to the material is stopped and the material is sustained at approximately 220° F. for approximately thirty minutes by using a suitable heat source within the vessel, such as steam within a jacket in the vessel. Minimizing direct contact of steam with the soybean material avoids unnecessary soaking and overcooking of the soybean material. After thirty minutes, the vessel is vented at subatmospheric pressure thereby removing substantially all of the alcohol from the proteinaceous soybean material.

DETAILED DESCRIPTION OF THE PREFERRED EMBODIMENTS

The present invention employs a process which uses a minimum amount of a lower alcohol in treating a proteinaceous soybean material to remove undesirable flavor constituents and odors from the soybean material without overcooking. The lower alcohols useful in the process are methyl, ethyl and isopropyl alcohols although presently ethyl alcohol is preferred. Using a minimal amount of alcohol decreases several costs including the initial purchase cost of the alcohol, the disposal of the alcohol after usage and the cost of keeping track of the amount of alcohol in the user's possession per various government regulations. The proteinaceous soybean material is preferably in the form of a soybean flour, however, the process also works quite well on soy flakes before they are ground into flour.

The process may be applied to full-fat, low-fat or defatted cracked beans, grits or flour, although its greatest field of utilization appears presently to be in the treatment of defatted flour. Pretreated and partially denatured soybean materials such as, for example, those that have been heat-treated during extraction, tempering, flaking or grinding, may also be improved by the present process, including such materials as those partially denatured products having a PDI (protein dispersability index) of as low as 20 or 30.

Preferably, the soybean flour has a PDI of approximately 90. The process of the present invention decreases the PDI to approximately less than 10. The PDI is useful as a measure of the denaturization that occurs in the soy protein of the flour that alters the structure of the protein molecule resulting in the soybean material being more digestable. As the PDI of the flour is decreased, the denaturization of the protein is increased. It is believed that the molecular structure of the soybean is so changed that it can be more readily attacked by the enzymes and microorganisms of the digestive system.

The soybean material is contained within a closed vessel having an agitator. The material is continuously agitated such that the material within the bed is "fluidized."

In a preferred process as is discussed further in a subsequent example, the vessel used to treat the soybean meal is a commercially available reactor, known as "DVT," manufactured by Littleford Bros., Inc. of Florence, Kentucky. The reactor has a central shaft with plough-shaped blades and at least one additional agitator, positioned on an inner wall of the vessel rotating at a higher speed than the central shaft with plough-shaped blades. The combined rotation of the agitators and ploughs and the speed at which they are rotated "fluidize" the soybean material within the reactor.

A pressure of approximately 15 PSI to 26 PSI is used within the vessel in treating the soybean material. In a preferred system, ethyl alcohol is initially present along with a minor amount of water with the soybean material. Live steam is introduced in a suitable manner into the vessel, heating the proteinaceous soybean material and vaporizing the alcohol and water such that the soybean material is placed in intimate contact with the alcohol vapor. Sufficient amounts of live steam are injected into the vessel to bring the temperature of the proteinaceous soybean material to preferably 220° F. and then the steam is turned off.

Through experimentation it has been determined that the desirable amount of alcohol that should be used is 9 pounds of alcohol to every 60 pounds of soybean material. Substantially less alcohol such as 6 pounds does not sufficiently treat the soybean material. Although 9 pounds of alcohol to 60 pounds of soybean material is a preferable ratio, more alcohol can be used to obtain a satisfactorily treated soybean material and greater ratios of alcohol are includable within the present invention. However, greater ratios of alcohol increase the cost of treating the soybean material.

The vessel containing the proteinaceous soybean material is preferably a jacketed vessel having a suitable heating medium such as steam supplied into the jacket. The heat from the jacket sustains the proteinaceous soybean material at approximately 220° F. during the course of treating the material with the alcohol vapors while minimizing direct contact of the soybean material with steam. The proteinaceous soybean material is sustained at 220° F. for approximately at least thirty minutes which allows sufficient time for the alcohol to extract the undesirable flavor constituents from the soybean material and produce a digestable soybean material.

The previously-mentioned requirements are subject to some variation depending upon the temperature and the time the soybean material is treated with the alcohol. For example, if 240° F. was used to treat the material, then the soybean material would be held at approximately 240° F. for approximately 5 minutes. It has been found that the top temperature that can be used to treat the soybean material without detrimental effects to the material is approximately 280 F. with no hold time. Once the temperature reaches 280° F., the treatment with alcohol is stopped as discussed subsequently in Example 2. Exceeding the temperature and time constraints generally results in a burned product that is grainy and brown in color. It has also been found that proteinaceous soybean material treated at 190° F. for any length of time produces an unacceptable product. An acceptable product is reached at approximately 200° F. and a product having preferred qualities achieved at a treatment temperature of at least 215° F. for at least thirty minutes. However, in all cases the process parameters are so selected as to reduce the PDI to well below the initial value, and generally to a final value of no higher than 10.

After the proteinaceous soybean material has been sufficiently treated with the alcohol vapors, the vessel is vented to a vacuum environment, preferably 25-26 inches of Hg with a vacuum pump. At 25-26 inches Hg, water boils at approximately 126° F. The proteinaceous soybean material is kept at preferably approximately 130° F. and no higher than 135° F. to remove the alcohol vapor without browning the proteinaceous soybean material. A preferred temperature range during venting to remove the alcohol from the proteinaceous soybean material is approximately 125° F. to 130° F.

The low PDI value of less than 10, obtained in soybean materials processed in accordance with the present invention, makes possible the preparation of a high protein concentrate with minimal loss of protein values. Simple water extraction may be used to remove the water-soluble and none-nutritive carbohydrate components without appreciable loss of the protein. The result after drying is a concentrate containing at least about 70% of total protein by Kjedahl Nitrogen, Association of Official Analytical Chemists, method 2.057, 1980 13th Edition. The high protein content and a substantial absence of undesirable flavor constituents render the product particularly attractive as a food supplement. The food supplement is especially useful in the feeding of young domestic animals, ruminant or otherwise, which employ monogastric digestion, e.g., calves. The product obtained through the process of the present invention when combined with other materials in a milk-like form, i.e., a fluid mixture of soybean flour and other materials in water, when fed to calves or other young domestic animals, provides a significant increase in the growth rate of the animal as compared with that obtained with milk substitutes prepared from conventionally heat-treated soybean products.

The following examples are illustrative only and are not intended to limit the present invention. The examples are submitted in order to demonstrate more explicitly the process of the present invention.

EXAMPLE 1

In a pilot plant process, 60 pounds of a commercially defatted soybean flour having a PDI of approximately 90 is loaded into a commercially available reactor known as a "DVT-130-(1-Z) Polyphase Reactor" manufactured by the Littleford Bros., Inc. of Florence, Kentucky having a generally horizontal agitator with plough-type blades and at least one other agitator, referred to as a "chopper". The soybean flour is mixed in the reactor with 9 pounds of type 3A alcohol (a specially denatured ethyl alcohol-90% ethanol, 5% methanol and 5% water) and 6 pounds of water. The reactor is then sealed off and the alcohol and water are mixed with the soybean flour using the agitators of the reactor. The agitators in the reactor are turned on and the mixture is blended for approximately 5 minutes. After 5 minutes, steam is turned on into the jacket of the reactor to bring the product temperature to approximately 125° F. The agitators in the reactor "fluidize" the material for better contact with the alcohol. At approximately 125° F., a valve is opened and steam is injected directly into the "fluidized" soybean flour/alcohol mixture until the temperature of the flour/alcohol mixture reaches 220° F. At approximately 220° F., the steam injection is stopped and the flour/alcohol mixture is held within the reactor for approximately 30 minutes. The flour/alcohol mixture is held at a pressure range of 15 psi to 26 psi within the reactor. If the flour/alcohol mixture temperature starts to fall, steam is introduced once again into the jacket of the reactor to hold the temperature at approximately 220° F. for the 30 minutes. Alternatively, if the flour/alcohol mixture temperature rises, cold water is introduced into the jacket to bring the temperature down to 220° F. After approximately 29 minutes, the agitators are turned off and the flour/alcohol mixture is allowed to settle. At the end of the 30 minute period, the reactor is slowly vented to 25-26 inches Hg of vacuum by a conventional vacuum pump. Slow venting prevents the drawing off of excess product into the vacuum lines. After venting, the agitator with the plough-type blades is turned on and the temperature is allowed to fall to approximately 130° F. At approximately 26 inches of mercury the boiling point of water is 126° F., and the boiling point of ethyl alcohol is 95° F. By maintaining the reactor temperature at 125°-130° F., all of the alcohol is removed from the product and most of the water is removed. After approximately 25-30 minutes of drying, the agitator with the plough is turned off along with the vacuum and the product removed from the reactor and processed further into an animal food supplement. The flour has a generally bland taste with substantially no soybean odor, and a generally white non-grainy appearance having water retentive properties.

Feeding tests were conducted on calves, in which the calves were fed three types of milk replacer. The first type (A) was an all milk replacer whose source of protein was whey and casein. The second type (B) included soybean material prepared using conventional heat treating of the soybean flour and having a PDI of approximately 20. The third type (C) included soybean material processed in accordance with the present invention. In each case, the protein source was mixed with other common nutrients such as whey, animal or vegetable fat, vitamins, and minerals. The protein source was mixed with the nutrients in approximately the ranges of 26-27% protein source, 22-23% fat based powder, 45-48% whey and 1½% vitamins and minerals. This mixture was then mixed with water to form a milk-like substance which was fed to the animals. In each instance, the test extended for 28 days.

Table 1 below shows the gain in weight, in lbs., during the tests. Each column represents one 28 day test with the last column, titled "OVERALL", indicating the average of the five tests for each type of replacer. A normalized percentage is given in parantheses in the last column, with the all milk replacer being used as a base of 100% for comparing overall results. As can be seen, the replacer using protein material processed in accordance with the present invention is quite close to an all milk replacer.

TABLE 1

| | Weight Gain in Pounds in 28 Days | | | | | |
|---|---|---|---|---|---|---|
| | TEST | | | | | OVERALL |
| REPLACER | 1 | 2 | 3 | 4 | 5 | AVERAGE |
| A | 34.9 | 26.9 | 15.9 | 32.3 | 21.1 | 26.2 (100%) |
| B | 23.6 | 20.3 | 15.5 | 16.5 | 13.5 | 17.9 (68.3%) |
| C | 30.5 | 26.9 | 19.4 | 24.1 | 18.1 | 23.8 (90.8%) |

Table 2 shows the replacer consumption per calf for 28 days for the trials conducted in Table 1 and indicates that the calves in the test ate approximately the same amount of milk replacer.

TABLE 2

| | Replacer Consumption - Pounds Per 28 Days Per Calf | | | | | |
|---|---|---|---|---|---|---|
| | TEST | | | | | OVERALL |
| REPLACER | 1 | 2 | 3 | 4 | 5 | AVERAGE |
| A | 46.55 | 46.23 | 40.03 | 47.68 | 36.82 | 43.46 |
| B | 44.10 | 44.04 | 43.91 | 43.75 | 34.28 | 42.02 |
| C | 46.92 | 47.80 | 45.35 | 47.76 | 38.48 | 45.26 |

Table 3 shows the effect on the health of the calves in the trials for the three types of milk replacers. The numbers in each column represent a score scour for the 28 days with normal=1; loose=2; watery=3; and blood or mucus=4. As indicated by the overall average, the replacer using soy material made in accordance with the present invention results in the calves being in a more normal health state than the other types of replacers.

TABLE 3

| | Scour Score for 28 Days | | | | | |
|---|---|---|---|---|---|---|
| | TEST | | | | | OVERALL |
| REPLACER | 1 | 2 | 3 | 4 | 5 | AVERAGE |
| A | 1.38 | 1.37 | 1.51 | 1.31 | 1.27 | 1.37 |
| B | 1.29 | 1.31 | 1.36 | 1.32 | 1.29 | 1.31 |
| C | 1.25 | 1.20 | 1.21 | 1.16 | 1.21 | 1.21 |

EXAMPLE 2

The procedure of Example 1 was repeated, except that live steam was injected into the reactor until the flour/alcohol mixture temperature reached 280° F. At that time, the steam injection was turned off along with the agitators and the vessel vented. The temperature of the flour/alcohol mixture was allowed to fall to approximately 130° F. for drying. A flour having a generally bland taste with substantially no soybean odor, and a generally white non-grainy appearance with water retentive properties was produced.

EXAMPLE 3

The procedure of Example 1 was followed, except that steam injection into the reactor was continued until the flour/alcohol mixture reached approximately 240° F. At approximately 240° F., the steam injection was turned off along with the chopper and the product held for approximately 5 minutes with the plough-type blade agitator mixing the product for the 5 minutes. At the end of the 5 minute hold period, the reactor is vented as in example 1 and the temperature allowed to fall to approximately 130° F. A flour having a generally bland taste with substantially no soybean odor, and a generally white non-grainy appearance with water retentive properties was produced.

EXAMPLES 4–8

Trials using various ratios of alcohol with respect to soybean material were performed using the conditions and procedures of Example 1. The amounts of alcohol tried were 3 pounds, 6 pounds, 9 pounds, 18 pounds and 27 pounds with 60 pounds of soybean flour. The soybean flour treated in the trials with 9, 18, and 27 pounds of alcohol to 60 pounds of soybean material exhibited similar band characteristics in gel electrophoresis as the material in Example 1. The soybean flour treated in the trials using 3 and 6 pounds of alcohol did not exhibit similar band characteristics in gel electrophoresis as the material tested in Example 1. From Examples 4–8, it is understood that at least approximately 9 pounds of alcohol with 60 pounds of soybean material must be used to treat the soybean material satisfactorily using the process of the present invention. Although the levels of alcohol between 6 and 9 pounds were not specifically tested, it is also understood that soybean material treated with amounts of alcohol between 6 and 9 pounds per 60 pounds of soybean material, that exhibits band characteristics in gel electrophoresis which are similar to the material tested in Example 1, is within the scope of the present invention.

CONCLUSION

The present invention provides an improved process that treats soybean material by making the soybean material digestable and extracting undesirable tastes and odors from the soybean material using a minimum amount of alcohol. The process directly subjects the soybean material to a minimum amount of steam, avoiding unnecessary soaking and overcooking of the soybean material. Substantially all of the alcohol, used to treat the soybean material, is removed in an easy and efficient manner by subjecting the alcohol to subatmospheric pressure at an elevated temperature that will not brown the soybean material.

Although the present invention has been described with reference to preferred embodiments, workers skilled in the art will recognize that changes may be made in form and detail without departing from the spirit and scope of the invention.

What is claimed is:

1. A process for treating a particulate soybean material, comprising:
   mixing a lower alcohol with a proteinaceous soybean material in a ratio that is at least approximately 9 pounds of alcohol to 60 pounds of soybean material in a closed vessel such that
   the proteinaceous soybean material/alcohol mixture is fluidized;
   introducing steam directly to the proteinaceous soybean material/alcohol mixture to heat the material to a treatment temperature to a maximum of approximately 280° F. thereby vaporizing the alcohol such that the alcohol is placed in intimate contact with the soybean material under superatmospheric pressure;
   stopping the steam flow to the proteinaceous soybean material/alcohol mixture after the treatment temperature has been reached;
   holding the soybean material/alcohol in a temperature range of approximately 190° F. to 280° F. without further introduction of steam in direct contact with the soybean material and until the soybean material reaches a PDI of approximately less than 10; and
   venting the lower alcohol vapors from the enclosed vessel only after the soybean material has reached a PDI of approximately 10 to subatmospheric pressure while holding the temperature of the proteinaceous soybean material above the boiling point of the lower alcohol at the subatmospheric pressure thereby removing substantially all of the lower alcohol from the proteinaceous soybean material.

2. The process of claim 1 wherein the steam is introduced to the proteinaceous soybean material/alcohol mixture until a treatment temperature of approximately 220° F. is reached.

3. The process of claim 2 wherein the proteinaceous soybean material is held for approximately thirty minutes at approximately 220° F.

4. The process of claim 3 wherein the proteinaceous soybean material is held for approximately thirty minutes at approximately 220° F. by introducing steam into a jacket of the closed vessel.

5. A substantially digestable soybean material having a PDI of less than 10 characterized by its bland taste, lack of soybean odor, generally white appearance, and exhibiting water-retentive characteristics produced in accordance with the process of claim 1.

6. The process of claim 1 wherein the lower alcohol is substantially all ethanol.

7. The process of claim 1 wherein the lower alcohol is a mixture of 90% ethanol, 5% methanol and 5% water.

8. The process of claim 1 wherein the proteinaceous soybean material is treated with lower alcohol vapors under a pressure range of 15 psi to 26 psi.

9. The process of claim 1 wherein the closed vessel is vented to a pressure range of approximately 25-26 inches Hg.

10. The process of claim 9 wherein the temperature of the proteinaceous soybean material is kept at a maximum of 130° F. after venting until substantially all the alcohol vapor is removed from the soybean material.

11. The process of claim 1 wherein the proteinaceous soybean material is fluidized by a plurality of agitators located within the vessel.

12. The process of claim 10 wherein the proteinaceous soybean material is mixed with nutritional materials and water to provide a milk-like substance for feeding to young animals.

13. A method of improving the growth rate of young animals employing monogastric digestion comprising:
   mixing a lower alcohol with a proteinaceous soybean material in a ratio that is at least approximately 9 pounds of alcohol to 60 pounds of soybean material in a closed vessel such that the proteinaceous soybean material/alcohol mixture is fluidized;
   introducing steam directly to the proteinaceous soybean material/alcohol mixture to heat the material to a treatment temperature to a maximum of approximately 280° F. thereby vaporizing the alcohol such that the alcohol is placed in intimate contact with the soybean material under superatmospheric pressure;
   stopping the steam flow to the proteinaceous soybean material/alcohol mixture after the treatment temperature has been reached;
   holding the soybean material/alcohol in a temperature range of approximately 190° F. to 280° F. without further introduction of steam in direct contact with the soybean material and until the soybean material reaches a PDI of approximately less than 10;
   venting the lower alcohol vapors from the enclosed vessel only after the soybean material has reached the PDI of approximately 10 to subatmospheric pressure while holding the temperature of the proteinaceous soybean material above the boiling point of the lower alcohol at the subatmospheric pressure thereby removing substantially all of the lower alcohol from the proteinaceous soybean material;

mixing the proteinaceous soybean material and other nutritional materials and water to provide a milk-like substance; and feeding the milk-like substance to a young animal.

14. The method of claim 13 wherein the young animal is a calf.

15. The method of claim 13 in which the other nutritional materials are substances from the group consisting of whey, animal or vegetable fat, vitamins and minerals.

* * * * *